May 30, 1967 OLE-BENDT RASMUSSEN 3,322,613
LAMINATED SHEET MATERIAL
Filed Feb. 11, 1963
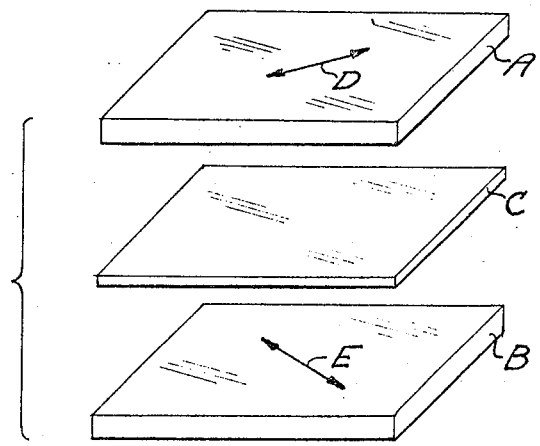
Inventor
Ole-Bendt Rasmussen
By Sol Shappirio
attorney

United States Patent Office 3,322,613
Patented May 30, 1967

3,322,613
LAMINATED SHEET MATERIAL
Ole-Bendt Rasmussen, Birkerod, Denmark, assignor to Phillips Petroleum Company, a corporation of Delaware
Filed Feb. 11, 1963, Ser. No. 257,669
5 Claims. (Cl. 161—234)

This invention relates to laminated sheet material, particularly suited for packaging purposes, having good tear strength.

The present application is a continuation-in-part of my application, Ser. No. 26,267, filed on May 2, 1960, now abandoned, which in its turn is a continuation-in-part of my application, Ser. No. 510,510, filed on May 23, 1955, now abandoned.

The invention is based on the well known fact that several linear superpolymerisates can acquire a greatly improved tensile strength in one direction by a cold stretching process. Crystalline spherolitic superpolymerisates such as nylon, polyethylene terephtalate, polyethylene, isotactic polypropylene and polyvinylidene chloride, exhibit this property to a very high degree. These particular compounds are transformed by cold stretching into a highly crystalline state in which they have acquired a fibrillar microstructure. The fibrils of this structure form crystalline regions, usually about 1–4 microns thick, i.e. a thickness corresponding substantially to the diameter of the spherolites of the unoriented material, and are composed of much smaller crystallites. The fibrils are oriented mainly parallel to each other in the stretching direction, but are very twisted and infiltrated and also interconnected actually forming a network. The crystallinity makes the fibrils relatively hard. They are surrounded by a matrix which consists of the substance in a more or less amorphous state which is softer than the crystalline fibrils. The matrix makes possible a mutual dislocation of the fibrils, without splitting of the material, and the lower the stretching temperature is, the more infiltrated become the fibrils, and the more spacing filled with matrix occurs between the fibrils. This means that the fibrils become mutually more flexible, and accordingly, the tear strength of the laminated material is substantially increased.

The invention, therefore, consists in a laminated film, comprising at least two unilinearily oriented layers of a material selected from the group of the linear, saturated, highly crystalline and spherolite-forming superpolymerisates, consisting of nylon, terepthalic acid polyesters, polyethylene, isotactic polypropylene and polyvinylidene esters, the orientation of which has been carried out at a temperature far below the crystal melting point, and the directions of orientation of adjacent layers forming an angle with one another, said layers being flexibly bonded together by means of a pressure-sensitive adhesive.

Contrary to known sheet materials, a laminated material according to this invention shows increased tear strength not only in initial tears, but also against further tearing from already formed tears or ruptures.

In order to get these results, the stretching of the sheets should be carried out at temperatures at least 70° C. below the crystal melting point of the material, preferably at room temperature or even lower. In some cases, cooling of the material during the stretching operation is preferred in order to compensate for the heat of stretching.

The preferred material for the sheet material is the so-called linear polyethylene (as distinguished from the branched type polyethylene), having a specific gravity of at least 0.94 and an average molecular weight of at least 50,000, because of its high crystallinity. Also isotactic polypropylene has proved advantageous.

The cold-stretching operation may introduce some permanent internal tensions in the sheet material which may cause folding or rolling of the sheets. In order to eliminate these tensions, an additional slight annealing or slight stretching at higher temperature may prove useful. Of course, such subsequent treatment should not materially affect the orienting introduced by the cold stretching.

In any case the layers from which the laminate is build up must be intimately connected by pasting or bonding the single layers together by means of a pressure-sensitive adhesive, as this has proved to improve the tear resistance several times, compared with the use of binders of a strength similar to that of the stretched superpolymerisate. This is because an adhesive of this kind, having the property of cold flowing, permits some mutual displacement of the layers on tearing from a rupture, allowing the fibrils to be displaced relatively independently of each other.

Although not preferred, the layers can be bonded with binders or adhesive pastes for general use, including thermoplastic or thermosetting resins, and one can also use a solution of the substance from which the stretched layers are made. As an example of a treatment, by which the stretched layers are bonded together without the use of a binder, layers of nylon can be treated with a swelling agent which is removed, preferably by evaporation while the layers are pressed together.

The pressure-sensitive adhesives preferred at present are polyisobutylene, polyvinylisobutyl ethers, or fatty polyamides of the normally tacky types, exhibiting a substantial cold flow.

However, it is desirable that the cold flowing of the applied adhesive sets in only when the laminated product is subjected to tearing forces of some strength, since normally the layers should be comparatively rigidly interconnected.

It has been found that excellent results are obtained by using a polyvinylisobutyl ether containing 20–30% of a microcrystalline mineral wax.

In an adhesive of this composition, the wax acts as a stabilizing agent so that the coldflowing property is evidenced only when the laminated product is subjected to severe stresses.

In the accompanying drawing, an exploded view is shown of a laminate of the invention, consisting of two cold stretched sheets A and B and a layer of adhesive C. As indicated by arrows D and E, the direction of orientation produced by the cold stretching are perpendicular to each other.

The following example is illustrative of the laminated film of the invention, and its production.

The laminated film consists of two layers of polyethylene of a thickness of $25\mu$, united by $10\mu$ of pressure-sensitive adhesive.

The polyethylene layers are produced from a material consisting of 90% by weight of high-density polyethylene with a specific weight of 0.96, and melting index 0.2, and 10% by weight of polyisobutylene, which is extended to a tubular film of $70\mu$ thickness. In direct continuation of the extension, the flattened tubular film is stretched at room temperature to 4.2 times the original length thereby contracting about 70% in width.

The tubular film is blown up and cut helically at an angle of 45° to the longitudinal direction to a film of the desired width.

The extension and stretching are preferably carried out in rotating apparatuses, and cutting helically is done with a fixed knife. Thus, it is possible to continuously supply a film of $25\mu$ thickness, which is oriented in a direction forming an angle of 45° degrees to the longitudinal direction, to the laminating apparatus.

In similar manner, another similar film is produced and fed into the laminating apparatus in such manner that its direction of orientation forms an angle of 90° with that of the first film.

Before being fed into the laminating apparatus, consisting of a pair of rotating steel rollers, each film is provided with a layer of pressure-sensitive adhesive, which is produced by melting a mixture of 80% by weight of polyisobutylene ether with 20% by weight of microcrystalline mineral wax, and applying the melted mixture to the films by means of rollers in known manner in an amount resulting in an adhesive layer of a thickness of 10μ.

The resulting product is well suited for making bags, for example for a content of 50 kilograms of fertilizer in each bag.

Comparative tests have been carried out, in which the tear strength was determined in the following films.

A: Non-oriented polyethylene.
B: Non-oriented polyvinyl chloride.
C: Cross-laminated polyethylene of the invention.
D: Cross-laminated polyvinyl chloride.

Of each material and in each test, 5 samples $a$, $b$, $c$, $d$, and $e$, were selected and tested in manner corresponding to that described in DIN 53 356 (a German Standard testing method), the results being given in the following table.

phthalic acid polyesters, polyethylene, isotatic polypropylene and polyvinylidene chloride, the orientation of which has been carried out by stretching at a temperature far below the crystal melting point, and the directions of orientation of adjacent layers forming an angle with one another, said layers being flexibly bonded together by means of a pressure-sensitive adhesive.

2. The laminated film of claim 1, in which the layers consist of polyethylene having a specific gravity of at least 0.94, and the adhesive is a polyvinylbutyl ether.

3. The laminated film of claim 1, in which the layers are made from 90% by weight of polyethylene and 10% by weight of polyisobutylene, and the adhesive is a mixture of a polyvinylbutyl ether with 20 to 30% by weight of a microcrystalline mineral wax.

4. A laminated sheet comprising at least two plies of uniaxially oriented polyethylene, the plies of polyethylene having been oriented by stretching at about room temperature, the directions of orientation of adjacent plies forming an angle with one another, and said plies being bonded together by a highly elastic, flexible adhesive.

5. A laminated sheet comprising at least two plies of uniaxially oriented crystalline polypropylene, said plies having been oriented by stretching at a temperature at least 70° C. below the crystal melting point of the polymer, the directions of orientation of adjacent plies forming an angle with one another, and said plies being bonded together with a flexible, pressure-sensitive adhesive.

| Material | Tear direction | Test No. | Thickness of samples in μ | | | | | Tear strength of samples in grams | | | | |
|---|---|---|---|---|---|---|---|---|---|---|---|---|
| | | | a | b | c | d | e | a | b | c | d | e |
| A | Transverse to extrusion direction. | 1 | 38 | 38 | 40 | 42 | 41 | 100 | 100 | 110 | 100 | 105 |
| | | 2 | 40 | 40 | 42 | 39 | 44 | 130 | 140 | 151 | 138 | 142 |
| | Parallel to extrusion direction. | 3 | 38 | 38 | 40 | 41 | 38 | 180 | 195 | 190 | 195 | 200 |
| | | 4 | 40 | 41 | 40 | 42 | 42 | 180 | 190 | 190 | 210 | 220 |
| B | Transverse to the casting direction. | 5 | 39 | 40 | 40 | 40 | 40 | 34 | 34 | 35 | 34 | 35 |
| | | 6 | 40 | 39 | 40 | 40 | 40 | 34 | 34 | 34 | 34 | 34 |
| | Parallel to casting direction. | 7 | 38 | 38 | 40 | 38 | 40 | 20 | 24 | 26 | 26 | 26 |
| C | Parallel to the direction of orientation in one layer. | 8 | 40 | 39 | 40 | 41 | 40 | 250 | 350 | 450 | 450 | 500 |
| | | 9 | 40 | 40 | 41 | 40 | 40 | 350 | 400 | 450 | 450 | 450 |
| D | Random. | 10 | 40 | 40 | 38 | 42 | 40 | 28 | 28 | 28 | 28 | 28 |
| | | 11 | 44 | 44 | 46 | 44 | 44 | 30 | 32 | 30 | 32 | 32 |

A comparison between materials A and C shows the substantial improvement in tear strength of the laminate of the invention as compared with a single layer unoriented film of the same material and thickness, whereas a comparison between materials B and D shows that no improvement is obtained by laminating polyvinyl chloride films, which are outside the scope of the invention.

I claim:

1. A laminated film, comprising at least two unilinearly oriented layers of a material selected from the group of the linear, saturated, highly crystalline and spherolite-forming superpolymerisates, consisting of nylon, tere-

References Cited

UNITED STATES PATENTS

| 2,067,025 | 1/1937 | Schmidt | 161—402 |
| 2,631,954 | 3/1953 | Bright | 161—167 |
| 2,656,297 | 10/1953 | Davis et al. | 161—191 |
| 2,664,378 | 12/1953 | Heller | 156—333 |
| 2,851,389 | 9/1958 | Lappala | 161—143 |

EARL M. BERGERT, *Primary Examiner.*

R. I. SMITH, M. L. KATZ, *Assistant Examiners.*